United States Patent Office 3,416,884
Patented Dec. 17, 1968

3,416,884
CRYSTALLINE ZIRCONIUM PHOSPHATES
James Albert Stynes, Lewiston, N.Y., and Abraham Clearfield, Athens, Ohio, assignors to National Lead Company, New York, N.Y., a corporation of New Jersey
No Drawing. Continuation-in-part of application Ser. No. 213,596, July 31, 1962. This application Nov. 4, 1966, Ser. No. 591,965
10 Claims. (Cl. 23—105)

ABSTRACT OF THE DISCLOSURE

Crystalline zirconium phosphates $Zr(HPO_4)_2$ and $Zr(HPO_4)_2 \cdot H_2O$ are produced by refluxing gelatinous zirconium phosphate with orthophosphoric acid in an aqueous solution of at least 2.5 molarity. The products, which have usefulness as ion exchange materials and catalysts, have an X-ray diffraction pattern in which there is a major reflection peak at 7.56 A.–8.0 A. and other major peaks at approximately 4.46 A. and 3.57 A., and by the half width of the first mentioned peak being not more than 1.4°.

---

This application is in part a continuation of application Ser. No. 213,596, filed July 31, 1962, now abandoned.

The invention of the present application relates to the production of novel, crystalline, zirconium phosphates.

It is an object of the present invention to provide zirconium monohydrogen-orthophosphate monohydrate in crystalline form.

Another object of the present invention is to provide novel zirconium phosphate ion exchange materials.

A further object of the invention is to provide a novel process for making a crystalline zirconium phosphate.

Zirconium phosphate is known to have ion-exchange characteristics and its use in the removal of undesired ions from solutions has been previously suggested. However, when a zirconium orthophosphate is precipitated by mixing phosphoric acid or a solution of a soluble phosphate with a solution of a zirconium salt the product is amorphous, gelatinous, and very difficult to filter. Although by some variations in the conditions of precipitation it has been possible to reduce the gelatinous nature of the precipitate and thus improve its filtration characteristics, the products obtained are still essentially amorphous, since the crystallite size is extremely small and there is such a lack of lattice perfection that when attempting to obtain an X-ray diffraction pattern only a few, quite indefinite reflections are discernable.

It has now been discovered that novel, highly crystalline products may be produced by refluxing the known amorphous zirconium orthophosphate gels in strong, aqueous orthophosphoric acid solutions. On drying the novel, crystalline phosphate products over $P_2O_5$ or a similar dehydrating agent, free-flowing, water insoluble, crystalline white powders having sharp X-ray diffraction patterns and an average composition of $ZrO_2$, 40.8%, $P_2O_5$, 46.6%, $H_2O$, 12.5% are obtained.

Although the formula for these products could be written $ZrO(H_2PO_4)_2$, it has been found that one mol of water is released on drying at 100° C. Therefore the formula $Zr(HPO_4)_2 \cdot H_2O$, i.e. zirconium monohydrogen-orthophosphate monohydrate, is preferred since it appears to be more indicative of the true structure of the products described above. However, the structure of the compounds is not known with absolute certainty and, accordingly, it is not intended that the applicant shall be bound by the preferred formula although the latter will be used below for convenience in referring to the described novel crystalline products.

As mentioned above, the crystalline zirconium phosphate products represented by the formula $$Zr(HPO_4)_2 \cdot H_2O$$

lose a mol of water when heated to approximately 100° C. giving novel products which may be referred to as zirconium monohydrogen-orthophosphate. These partially dehydrated crystalline products are white, free-flowing powders which recombine with water in aqueous systems to re-form the hydrate. Their X-ray diffraction pattern is substantially identical with that of the corresponding mono-hydrates except for slight changes in intensity of reflections. This tend to substantiate the belief that one mol of water is present in the compound only as a hydrate since the basic X-ray pattern is not changed.

The following examples describe procedures for producing novel, crystalline $Zr(HPO_4)_2 \cdot H_2O$.

EXAMPLE 1

One hundred grams of zirconium phosphate gel obtained by the addition of zirconyl chloride solution to orthophosphoric acid was dispersed in 200 ml. of water by vigorous agitation. The resultant slurry was added to 1600 ml. of concentrated orthophosphoric acid. The diluted slurry, which had a molarity of 13 with respect to phosphoric acid, was refluxed for one hour. A sample was then removed and the solid matter of the sample was filtered off, washed to remove soluble impurities, and dried below 100° C. with $P_2O_5$. When examined by X-ray diffraction this solid matter was found to be highly crystalline. Refluxing of the rest of the slurry was continued for 24 hours and another sample was taken. The solid material in the second sample showed the same X-ray diffraction pattern as the first one. Analysis of the product showed $ZrO_2$, 40.8%, $P_2O_5$, 46.6%, and $H_2O$, 12.4%, corresponding to $Zr(HPO_4)_2 \cdot H_2O$.

EXAMPLE 2

Fifty grams of zirconium phosphate obtained as a gel by precipitation as above was dispersed in 1000 ml. of 8.4 molar orthophosphoric acid and refluxed for 24 hours. The solid content of the slurry was then filtered off, washed, and dried over calcium chloride. The crystalline product had the analysis $ZrO_2$, 40.94%, $P_2O_5$, 46.67%, $H_2O$, 12.20%, corresponding to $Zr(HPO_4)_2 \cdot H_2O$, and the X-ray diffraction pattern thereof was substantially the same as that obtained with the products of Example 1.

EXAMPLE 3

Fifty grams of the gelatinous zirconium phosphate obtained by adding zirconyl oxychloride solution to orthophosphoric acid was dispersed by vigorous stirring in 1000 ml. of 4.0 molar orthophosphoric acid and boiled with refluxing for 45 hours. The slurry was then filtered and the solid portion was washed and dried at a temperature below 100° C. The dried product had a highly developed crystallinity and an X-ray diffraction pattern like those of the crystalline phosphate products of Examples 1 and 2.

EXAMPLE 4

Fifty grams of the gelatinous zirconium phosphate obtained by adding zirconyl oxychloride solution to orthophosphoric acid was stirred vigorously with 1000 ml. of 2.65 molar orthophosphoric acid to form a slurry which was boiled with refluxing for 48 hours. The solid portion of the slurry was then filtered off, washed and dried over calcium chloride at a temperature below 100° C. The product obtained was crystalline with an X-ray diffraction pattern like those of the products of Examples 1, 2 and 3, but with somewhat broader reflection peaks.

In the preceding examples the gelatinous, amorphous zirconium phosphate employed was filtered and washed to remove soluble impurities before dispersion in the orthophosphoric acid and refluxing. It has been found that this is not a necessity. If desired, the amount of concentrated orthophosphoric acid required to raise the molarity to at least about 2.5 may be added to the slurry of precipitated gelatinous phosphate and the slurry may then be refluxed to obtain the crystalline zirconium monohydrogen-orthophosphate. The products obtained in this way are substantially as pure as those of Examples 1–3, inclusive.

As indicated above, the orthophosphoric acid molarity of the gelatinous phosphate slurries that are refluxed to produce the crystalline zirconium phosphate of the invention should be at least about 2.5 although the acid concentration may be as much higher as desired. In most cases a phosphoric acid molarity of about 8–13 is preferred since the necessary refluxing time is reduced. However, with a refluxing time of 48 hours good crystallization is obtained even with a phosphoric acid molarity of about 2.5. It will be understood that actual refluxing is not necessary, but that the temperature of the slurries may be maintained at or within a few degrees of the boiling point with substantially the same results.

The novel, hydrated, zirconium monohydrogen-orthophosphate products obtained by the present novel process, as mentioned above, are fine, free-flowing, water-insoluble crystalline powders. The density of the crystals is $2.76 \pm 0.01$ g./cm.$^3$ and they occur as hexagonal or triangular platelets although the true symmetry is monoclinic. When crystallinity is fully developed, they exhibit a characteristic X-ray diffraction pattern.

In the following table there are listed a significant number of the reflections of this pattern:

TABLE I

| $d$: | $I/I_0$ |
|---|---|
| 7.56 | 40 |
| 4.46 | 35 |
| 3.56 | 100 |
| 3.30 | 2 |
| 3.22 | 3 |
| 3.08 | 2 |
| 2.64 | 30 |
| 2.62 | 35 |
| 2.48 | 4 |
| 2.41 | 17 |

In some cases it has been found that during the period of crystalline development there is a preferred orientation of the crystallites in the product that results in the first of the above-listed reflections being the most prominent. Such products have a fibrous texture and when filtered form mat-like deposits on the filter that can be removed and dried as sheets.

It has also been observed that the interplanar spacings of crystalline zirconium monohydrogen-orthophosphate products in which the crystallinity is somewhat less than perfect tend to be somewhat larger than those of the fully crystalline material. For example, as crystallinity develops in products such as those produced in Example 3, the largest interplanar spacing varies from 8.0 A. to 7.7 A., depending upon the degree of perfection of the crystallites in the product. In the fully crystalline products the $d$ spacing is $7.6 \pm 0.1$ A. In gelatinous, non-crystalline, zirconium phosphate products $d$, insofar as it can be determined, is greater than 8.0 A. This variation in lattice spacing is important in characterizing the ion exchange behavior of the products, as will be seen hereinafter.

Gelatinous zirconium phosphate such as is used in preparing the novel, crystalline, zirconium phosphate of the present invention may be made in accordance with known procedures. The following example illustrates a typical method for preparing such a gel.

EXAMPLE 5

Fifty grams of zirconyl chloride octahydrate is dissolved in 100 ml. of water and added with stirring to 232 ml. of a 17% phosphoric acid solution (molarity 1.9) in water. The mixture is allowed to stand for 1 hour to improve filtering, after which the precipitate is filtered off and washed to remove soluble impurities. The precipitate is then dried over calcium chloride. The resulting gel product is in the form of hard granules of varying size quite unlike the fine, free-flowing, crystalline zirconium phosphate product obtained by the process of the present invention. By analysis the granules are found to comprise $ZrO_2$, 40.29%, $P_2O_5$, 46.9%, $H_2O$, 12.00%. Inspection of the product by X-ray diffraction, however, shows only an amorphous structure.

Although zirconyl chloride solutions are convenient to use in preparing gelatinous zirconium phosphate, any soluble zirconium salt, for example, the nitrate or sulfate, may be employed if desired.

As pointed out above, zirconium phosphate gels such as those obtained by the procedure of Example 5 are amorphous, moreover they remain amorphous, i.e. without any discernable X-ray diffraction pattern, even after aging, although they may become less gelatinous and more grainy in appearance. In some instances, when precipitation is carried out at elevated temperatures and with excess phosphoric acid, the gels may exhibit a few broad and diffuse reflections when they are examined by X-ray diffraction. When using a recording X-ray diffractometer, such reflections appear merely as broad humps on the graph at spacings approximating those of some of the sharp, well defined peaks obtained with the crystalline zirconium monohydrogen-orthophosphate monohydrate.

To make it clear that there is a definite distinction between the crystalline and non-crystalline products, it is convenient to compare the "half-widths" of the reflection peaks of the crystalline zirconium monohydrogen-orthophosphate monohydrate with those of the broad humps of the non-crystalline material. The term "half-width" is a convenient expression frequently used in X-ray technology to define the width (in degrees) of a reflection peak measured at the midpoint of its height. Customarily, the half-width is corrected for the instrumental broadening, which is a constant, that results from the particular apparatus used. From the half-widths of the peaks the approximate size of the crystallites of the materials may be calculated by known procedures.

In the following table, X-ray diffraction data for a crystalline zirconium monohydrogen-orthophosphate monohydrate (identified as C) such as the product of Example 1, and for a non-crystalline zirconium phosphate gel (identified as N) obtained by hot precipitation with an excess of phosphoric acid are compared. The gel tested showed the best defined reflections of a considerable number of gelatinous zirconium phosphates studied.

TABLE II

| | $D$, angstroms | Half-width, degrees | Approximate crystallite size, angstroms | $I/I_0$ |
|---|---|---|---|---|
| C | 7.56 | 0.00 | 1,000 | 40 |
| N | 8.11 | 1.54 | 52 | 10 |
| C | 4.46 | 0.12 | 400–800 | 35 |
| N | 4.52 | 0.86 | 94 | 13 |
| C | 3.56 | 0.12 | 400–800 | 100 |
| N | 3.63 | 2.94 | 28 | 15 |

In the foregoing table it will be seen that the $d$-spacings of the products are not identical and the half-widths are decidedly different. This is reflected in the differences in the approximate crystallite sizes, those of the phosphate gel being quite small. In a number of tests it has been found that a zirconium monohydrogen-orthophosphate monohydrate product can be considered crystalline when for the first reflection listed the $d$-spacing is not greater than 8.0 A. and the half-width of the first peak is not greater than 1.4°. This corresponds to a crystallite size of greater than approximately 8.0 A. in the measured direction. The $I/I_0$ figures are the intensities of the reflections relative to the crystalline peak at 3.56 A., with the latter being taken as 100.

As indicated above, amorphous, gelatinous zirconium phosphate has previously found some use as an ion-exchange material. It has been discovered that the crystalline zirconium monohydrogen-orthophosphate monohydrate products of the present invention show superior results as ion-exchange materials in two respects.

Tests were made with different samples of zirconium phosphate by the procedure described on page 79 of "Ion Exchange" by J. E. Salmon and D. H. Hale, published by Academic Press, Inc., New York City, 1959, to determine their ion exchange capacities with sodium chloride. The results are set forth in the following table.

TABLE III

| Sample | Milliequivalents per gram | | | | |
|---|---|---|---|---|---|
| | Sodium exchange capacity | | | Total | H/Zr |
| | Day 1 | Day 2 | Day 3 | | |
| A | 5.51 | 0.31 | 0.16 | 5.98 | 1.46 |
| B | 6.71 | 0 | 0 | 6.71 | 2.02 |
| C | 6.58 | 0 | 0 | 6.58 | 1.99 |
| D | 6.65 | 0 | 0 | 6.65 | 2.01 |

In Table III: Sample A was a gelatinous, amorphous zirconium phosphate such as is produced by the procedure of Example 5, Sample B was a crystalline zirconium monohydrogen-orthophosphate monohydrate such as is produced by the procedure of Example 2, Sample C was a crystalline zirconium monohydrogen-orthophosphate monohydrate such as that produced by Example 4, and Sample D was a crystalline zirconium monohydrogen-orthophosphate monohydrate such as is produced by the procedure of Example 4 but having the preferred crystal orientation referred to above.

It will be seen from Table III that not only is the ion exchange capacity of the crystalline zirconium phosphate products of the present invention greater than that of the amorphous, gelatinous phosphate, but also the rate of exchange is greater. Thus on the first day each of Samples B, C and D totally replaced its H$^+$ ion as shown by the H:Zr ratios, 2.0 being the theoretical maximum, while even after 3 days, Sample A still had a H:Zr ratio of only 1.46.

In other tests it has been found that the crystalline Zr(HPO$_4$)$_2$·H$_2$O of the present invention has more selective ion exchange properties with respect to certain cations than the gelatinous zirconium phosphate. In these tests it was found, for example, that at pH 3 the ion exchange capacity of the gelatinous phosphate for cesium ions (Cs$^+$) was about 1.5–2.0 meq./g. while the capacity of crystalline zirconium monohydrogen-orthophosphate monohydrate such as that resulting from the procedure of Example 2 for Cs$^+$ ions was only about 0.02–0.03 meq./g. On the other hand, at a pH of 3 the ion exchange capacity of the gelatinous zirconium phosphate for Na$^+$ ions was found to be about 1.8–2.0 meq./g. while the capacity of the crystalline zirconium monohydrogen-orthophosphate monohydrate for Na$^+$ ions was much greater, about 2.5–3.2 meq./g. Thus, by the use of the novel crystalline zirconium monohydrogen - orthophosphate monohydrate products of the present invention sodium ions (Na$^+$) may be selectively removed from a solution containing both sodium ions and cesium ions (Cs$^+$) leaving a solution richer in cesium. Other similar separations with the novel products may also be carried out.

The partially dehydrated crystalline zirconium monohydrogen-orthophosphate (Zr(HPO$_4$)$_2$) such as is obtained by drying zirconium monohydrogen-orthophosphate monohydrate at 100° C. is also useful as an ion exchange material.

In addition, the novel crystalline zirconium phosphate products may be employed as acidic catalysts such as are used to catalyze esterification reactions, the dehydrated product being of interest in those cases where anhydrous conditions are desired. Permeable membranes such as are used for electrodialysis may also be formed of the fibrous textured crystalline products with preferred orientation which are described above.

The present invention is also applicable to the production of crystalline hafnium monohydrogen-orthophosphate monohydrate. All zirconium ores contain a few percent of hafnium. Since zirconium and hafnium are unique in that their chemical behaviors are almost identical and much more alike than those of any other two elements, they are separated only with difficulty. Consequently, all zirconium compounds ordinarily contain a little hafnium although such hafnium is not usually regarded as an impurity. In the present case since there was no reason to work with expensive, purified materials, the zirconium salts contained about 2% hafnium so that the precipitated gelatinous zirconium phosphate also contained gelatinous hafnium phosphate which by the process of the present invention was converted to monohydrogen-orthophosphate monohydrate along with the zirconium. Obviously, by the use of zirconium salts free from all impurities including hafnium or hafnium salts free from all impurities including zirconium and equally pure reactants chemically pure zirconium or hafnium monohydrogen-orthophosphate monohydrate can be obtained as desired.

In the present application, references to percentages are meant to refer to percentages by weight unless otherwise indicated.

We claim:

1. A zirconium monohydrogen-orthophosphate characterized by a well defined crystallinity as evidenced by a major X-ray reflection peak at 7.56 A.–8.0 A. and other major peaks at approximately 4.46 A. and 3.57 A., by the half width of the said first mentioned peak being not more than 1.4°.

2. Crystalline zirconium phosphate as defined in claim 1 which has the approximate composition ZrO$_2$, 40.8%, P$_2$O$_5$, 46.6%, H$_2$O, 12.5%, corresponding substantially to the formula Zr(HPO$_4$)$_2$·H$_2$O.

3. Crystalline zirconium phosphate as defined in claim 1 which has the approximate composition ZrO$_2$, 44%, P$_2$O$_5$, 50%, H$_2$O, 6%, corresponding substantially to the formula Zr(HPO$_4$)$_2$.

4. Crystalline zirconium phosphate as defined in claim 2 which is characterized by a fibrous texture.

5. The process for producing zirconium monohydrogen-orthophosphate monohydrate characterized by a well defined crystallinity and by selective ion exchange characteristics which comprises heating a dispersion of gelatinous zirconium phosphate in aqueous orthophosphoric acid having a molarity of at least 2.5, at substantially the boiling point of said acid for a period of time sufficient for the zirconium phosphate to be characterized by an X-ray diffraction pattern in which there is a major reaction peak at 7.56 A.–8.0 A. and other major peaks at approximately 4.46 A. and 3.57 A., and by the half width of said first mentioned peak being not more than 1.4°, and filtering out the resultant crystalline zirconium phosphate.

6. A process as set forth in claim 5 in which said heating is carried on for at least 48 hours.

7. A process as set forth in claim 5 in which the molarity of the phosphoric acid solution is at least 4.

8. A process for separating sodium and cesium ions which comprises bringing an aqueous solution containing said ions into contact with the crystalline product defined in claim 1.

9. A process as set forth in claim 8 in which said product has the approximate composition $ZrO_2$, 40.8%, $P_2O_5$, 46.6%, $H_2O$, 12.5%, corresponding substantially to the formula $Zr(HPO_4)_2 \cdot H_2O$.

10. A process as set forth in claim 8 in which said product has the approximate composition $ZrO_2$, 44%, $P_2O_5$, 50%, $H_2O$, 6%, corresponding substantially to the formula $Zr(HPO_4)_2$.

References Cited

FOREIGN PATENTS 91,563   8/1961   Denmark.

OSCAR R. VERTIZ, *Primary Examiner.*

L. A. MARSH, *Assistant Examiner.*